United States Patent [19]
Brachman

[11] 3,940,467
[45] Feb. 24, 1976

[54] METHOD OF INJECTION MOLDING A STRUCTURAL FOAMED THERMOPLASTIC ARTICLE HAVING A UNIFORM SWIRL-FREE AND INDENT-FREE SURFACE

[75] Inventor: Armand E. Brachman, Allentown, Pa.

[73] Assignee: Bethlehem Steel Corporation, Bethlehem, Pa.

[22] Filed: Dec. 18, 1974

[21] Appl. No.: 534,102

Related U.S. Application Data

[63] Continuation-in-part of Ser. No. 381,289, July 20, 1973, abandoned.

[52] U.S. Cl......... 264/45.5; 260/2.5 F; 260/2.5 HB; 264/53; 264/328; 264/DIG. 5; 264/DIG. 14; 264/DIG. 83; 428/320
[51] Int. Cl.$^2$....................... B29D 27/00; B29F 1/00
[58] Field of Search.......... 264/48, 51, 53, DIG. 14, 264/DIG. 83, DIG. 5, 45.5, 328; 260/2.5 F, 2.5 HB; 428/320

[56] References Cited
UNITED STATES PATENTS

| | | | |
|---|---|---|---|
| 2,928,130 | 3/1960 | Gray | 264/50 |
| 3,151,192 | 9/1964 | Jacobs et al. | 264/53 |
| 3,268,636 | 8/1966 | Angell | 264/DIG. 83 |
| 3,436,446 | 4/1969 | Angell | 264/DIG. 83 |
| 3,674,401 | 7/1972 | Annis et al. | 264/DIG. 83 |

OTHER PUBLICATIONS
Czerski, J. "Injection–Moulded Foams," In *Plastics & Polymers*, Dec., 1971, pp. 406–411.
Bernhardt, Ernest C., Edt., "Processing of Thermoplastic Materials," New York, Reinhold, c 1959, pp. 154–165 (SPE Plastics Engineering Series).
Brydson, J. A., "Plastics Materials," Princeton, N.J., D. Van Nostrand, c 1966, pp. 64–73.

*Primary Examiner*—Philip Anderson
*Attorney, Agent, or Firm*—Joseph J. O'Keefe; Charles A. Wilkinson; John S. Simitz

[57] ABSTRACT

A process for producing a swirl-free, indent-free foamed thermoplastic structural article in which water is utilized as a foaming agent. Water and a melted thermoplastic resin are mixed together in an extruder to form a pressurized foamable mixture. The foamable mixture from the extruder is collected in an accumulator and from there is delivered to a cavity in a mold in a suitable clamping device. The pressure in the cavity is lower than the pressure of the foamable mixture in the accumulator or extruder therefore when the foamable mixture enters the cavity the foaming agent is released and the thermoplastic resin is frothed and expands to completely fill the cavity. The melted foamed thermoplastic resin cools in the mold and solidifies to form a foamed thermoplastic structural article. The quantity of water introduced into the extruder is between about 0.1 weight percent to about 0.5 weight percent of the thermoplastic resin charge in the extruder.

To produce a swirl-free foamed thermoplastic structural article the quantity of water introduced into the extruder is between about 0.1 weight percent and about 2.0 weight percent of the thermoplastic resin charge in the extruder.

8 Claims, 1 Drawing Figure

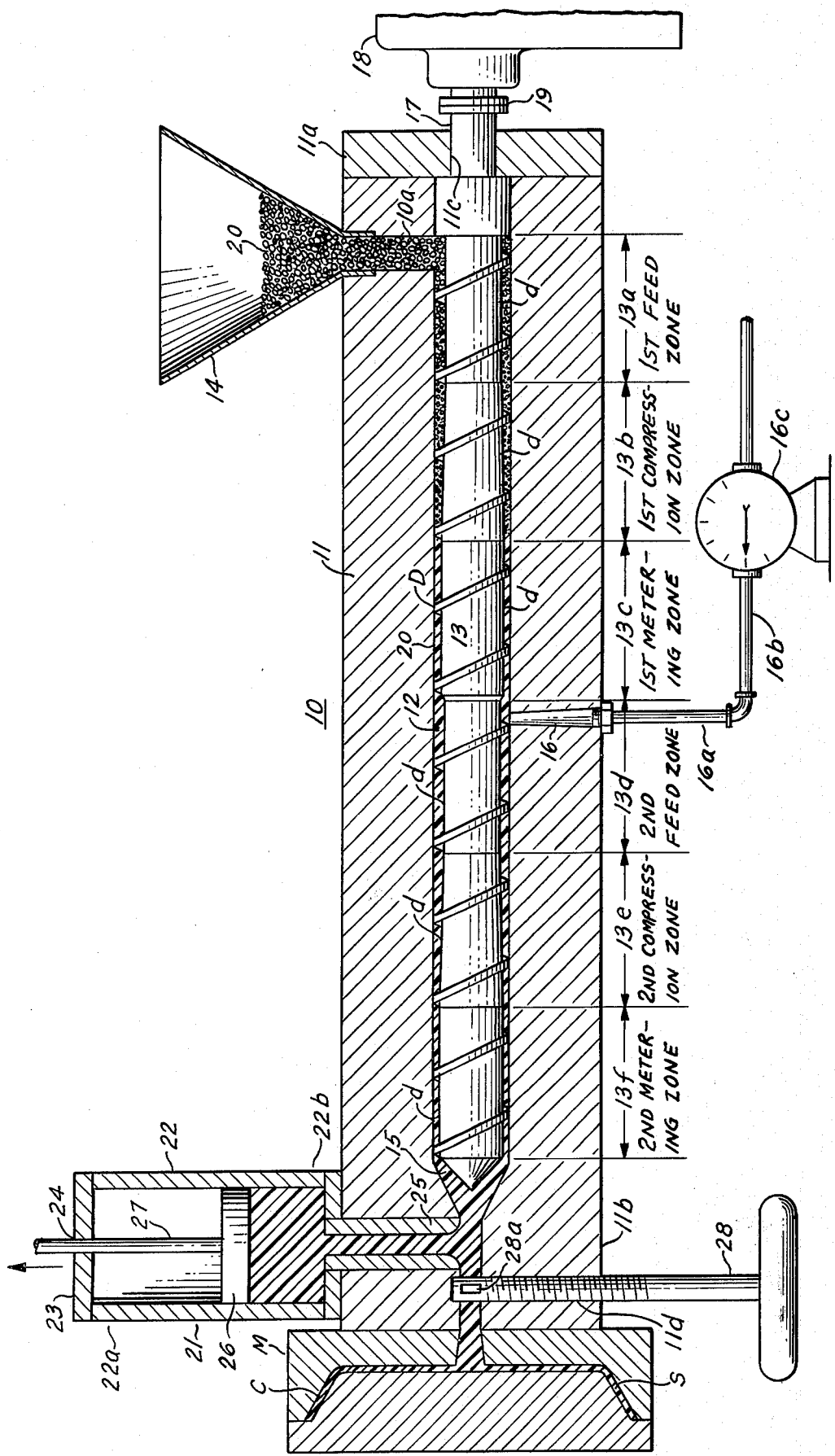

METHOD OF INJECTION MOLDING A STRUCTURAL FOAMED THERMOPLASTIC ARTICLE HAVING A UNIFORM SWIRL-FREE AND INDENT-FREE SURFACE

RELATED APPLICATIONS

This application is a continuation-in-part of U.S. Pat. application Ser. No. 381,289 filed July 20, 1973 and now abandoned.

BACKGROUND OF THE INVENTION

Applications of water in plastics are broadly known. One application of water in plastic compositions includes its use with a thermosetting plastic as a shattering agent. U.S. Pat. No. 3,639,549, for example, discloses the use of water with a polyester thermoset in which the temperature at which the resin sets is sufficient to convert the water contained in the plastic to steam. The expansion caused by generating steam from the water works at odds with the hardening of the resin and as a result the resin is cracked to produce a decorative effect.

Water has also been reported broadly as a foaming agent for plastics. However, water as a foaminig agent for plastics is a term which heretofore has been more a misnomer than a fact. For example, water has been named as a foaming agent in the foaming of polyurethanes. Water in this case is not the foaming agent, however, but acts instead as an initiator to generate the foaming agent. Water in this capacity reacts with polyisocyanates, the precursors of polyurethanes, to generate carbamic acid which under the conditions of the reaction instantaneously decomposes to produce carbon dioxide, the true foaming agent. Water present in urethane foam production is totally consumed by the carbamic acid production and decomposition reaction. It is the carbon dioxide that functions as the foaming agent in the foaming of polyurethane and this reaction, i.e. utilizing carbon dioxide as a foaming agent, is the leading method employed for the production of foamed polyurethanes. U.S. Pat. No. 3,694,530 to Wolfe, U.S. Pat. No. 3,658,972 to Ready et al., U.S. Pat. No. 3,590,012 to Hauptman, and U.S. Pat. No. 3,706,687 to Rudzki are examples of the disclosure of the function of water as an initiator in the production of polyurethanes.

Foaming of the resin in the production of thermoplastic articles other than polyurethanes is also known. Thermoplastics having good structural integrity can be prepared from a large category of foamed plastics which includes polystyrene, ABS (acrylonitrile-butadiene-styrene) resins, polyethylene, polypropylene, acrylics and other thermoplastics characterized by rigidity of structure after forming. These resins are often molded into articles which are not only rigid, but load-bearing and thus useful in building structures. Further, structural thermoplastics may also be foam molded, and in this capacity gaseous foaming agents are utilized.

The gaseous foaming agent for foamed structural thermoplastics may be a low boiling liquid, such as pentane. However, satisfactory incorportion and homogenization of a liquid foaming agent with solid resin pellets is one of the major problems in foam molding of this type. Consequently, solids such as azodicarbonamide which liberate gases when heated above their decomposition temperature are conventionally used with resin as a dry mix. However, residues remaining within the resin from such mixes can cause considerable discoloration and surface extrudates on the plastic.

Water as a foaming agent broadly falls within the category of volatile liquids such as pentane which might be considered as possible foaming agents for foamable structural thermoplastics. For example, see U.S. Pat. No. 3,268,636 and U.S. Pat. No. 3,436,446 to Angell. The use of water in foam molding to serve as a heat sink is disclosed in U.S. Pat. No. 3,475,354 to Needham and as a source of heat in U.S. Pat. No. 3,309,439 to Norweiler. The use of water as a foaming agent has been handicapped because, in foam molding, water is known to cause indent in the final article. Indent is a phenomenon in which the surface of the finished molded article does not completely conform to the mold pattern but is instead characterized by indents or depression where the foamed thermoplastic resin retracted from the mold surfaces during the cooling and settling period. The cause of indent is not known, but may be due to the premature condensation of steam resulting in the collapse of the steam pockets in the thermoplastic resin into smaller volume water pockets thereby causing a partial vacuum in the pockets and permitting the hot thermoplastic, which has not congealed, to partially collapse and recede from the surface of the mold.

One of the most common limitations encountered in foam molding, regardless of the foaming agent used, is "swirl". Swirl is, as the name indicates, a visible imperfection in the surface of the finished article. In the latter it may be characterized generally as an erosive pitting of the surface. Swirl may be characterized as (a) optical and (b) physical or surface swirl. Optical swirl is a faintly detectable random turbulence pattern visible on the surface of the foamed thermoplastic structural article. Optical swirl is believed to be due to alignment of the gas bubbles in the foamed thermoplastic article along the flow patterns, including any turbulence patterns generated in the melted thermoplastic resin, as the thermoplastic resin fills and is expanded in the cavity in the mold. Optical swirl is thus a congealed flow pattern in the congealed thermoplastic article made visible by partial alignment of the gas bubbles in the interior of the thermoplastic article along the flow patterns of the thermoplastic resin in the cavity of the mold. Optical swirl is not a prominent phenomenon and causes little problem as it can be easily hidden, where undesirable, by surface painting.

Physical swirl, on the other hand, appears to be the result of escape of some of the gas bubbles from the interior to the surface of the expanded thermoplastic resin before the thermoplastic resin congeals to form the finished article. These surface bubbles tend to migrate across the surface of the thermoplastic article between the still pliable thermoplastic resin and the surface of the cavity in the mold, often along the flow lines of the thermoplastic resin as it fills and expands in the cavity of the mold. Each bubble leaves behind it a bubble track or small groove across the surface of the foamed thermoplastic article. These grooves, which remain in the surface of the foamed thermoplastic article, are highly visible as a swirled pattern even after painting. For applications requiring a smooth or unpatterned surface, the swirl pattern is highly objectionable. The use of higher molding temperature is sometimes effective to remove the swirl pattern. The higher temperature allows the thermoplastic resin to stay soft longer so that the bubble tracks or grooves in the surface of the thermoplastic resin fill in before the thermoplastic resin congeals. Higher temperature, however, also means a longer cooling period in the cavity of the mold. Prolonged cooling time increases the production time cycle, making the use of a higher molding temperature uneconomical.

No practical process has heretofore been known which produced swirl-free or swirl-free, indent-free foamed thermoplastic structural articles. Therefore, there is a need for an economical process for producing swirl-free and swirl-free, indent-free foamed thermoplastic structural articles.

SUMMARY OF THE INVENTION

A foamed thermoplastic structural article which is swirl-free and indent-free can be produced by mixing water, as a foaming agent, with a melted thermoplastic resin in an extruder. The quantity of water is controlled within a range of about 0.1 to about 0.5 weight percent of the charge weight of thermoplastic resin. The foamable mixture of melted thermoplastic resin and water is forcibly injected into a cavity in a mold by way of an accumulator. The melted thermoplastic resin is frothed by the water as steam in the cavity. The melted thermoplastic resin is cooled and solidifies to form the foamed thermoplastic structural article.

A swirl-free foamed thermoplastic structural article can be produced by controlling the quantity of water mixed with the melted thermoplastic resin in the extruder within a range of not more than about 2.0 weight percent of the charge weight of the thermoplastic resin and at least sufficient to expand the melted thermoplastic resin in the cavity.

BRIEF DESCRIPTION OF THE DRAWING

The drawing is a diagrammatic sectional view of an apparatus which can be used in the process of the invention. The drawing shows a pressurized foamable thermoplastic resin being forced into an accumulator from an extruder while a foamed thermoplastic structural article which has been made from the preceding "shot" of foamable thermoplastic resin is being cooled in the cavity of a mold being used with the apparatus. A shot is defined as a quantity of pliable, mobile melted foamable mixture ejected from an accumulator and injected into a cavity in a mold to produce a foamed thermoplastic structural article.

DESCRIPTION OF THE PREFERRED EMBODIMENTS

I have found that a swirl-free or a swirl-free and indent-free foamed thermoplastic structural article can be made by employing water, in the form of steam, as a foaming agent. A swirl-free foamed thermoplastic structural article can be produced by adding water to a melted thermoplastic resin in a extruder in an amount between about 0.1 to 2.0 weight percent of the charge weight of the melted thermoplastic resin. A swirl-free and indent-free foamed thermoplastic structural article can be made by adding water in an amount between about 0.1 to about 0.5 weight percent of the charge weight of the melted thermoplastic resin.

A structural thermoplastic resin in manageable form, for example, powder, pellets or granules, is fed to an extruder. The thermoplastic resin is melted by heat and shear energy to form a pliable and mobile thermoplastic resin. As the melted thermoplastic resin is advanced through the extruder, water is injected into the extruder. The water is mixed with the melted thermoplastic resin by the mechanical action of the screw to form a pliable and mobile foamable mixture. The temperature and pressure are maintained at sufficiently high levels to prevent premature foaming of the foamable mixture and to provide a driving force for advancing the foamable mixture through the extruder and forcibly into an accumulator. Back pressure is applied to the foamable mixture in the accumulator. After a sufficient amount of the foamable mixture is collected in the accumulator, a valve, which isolates the accumulator and extruder from a cavity in a mold during the time the accumulator is being filled in the molding cycle, is opened. When communication is established between the accumulator and the cavity in the mold, the foamable mixture is rapidly transferred from the accumulator to the cavity. Since the cavity is at a lower pressure level than the foamable mixture, the water is released within the foamable mixture as steam, thereby converting the melted thermoplastic resin to a foam that expands to completely fill the cavity in the mold. The foamed thermoplastic resin is cooled when it contacts the surfaces of the mold and is solidified in the cavity to generate a foamed thermoplastic structural article. The surfaces of the mold are cooled by any one of several known means.

Suitable accumulators and molds for producing foamed thermoplastic structural articles are known in the art as exemplified in U.S. Pat. Nos. 3,436,446 and 3,268,636, both granted to Angell. These patents teach a process in which thermoplastic resin is mixed with pressurized nitrogen as the foaming agent to form a foamable mixture. A cavity in a mold is maintained at a lower pressure than the accumulator or extruder and upon introduction of the foamable mixture containing the pressurized nitrogen into the cavity, the pressurized nitrogen expands, causing the melted thermoplastic resin to froth and to expand, thus filling the cavity in the mold. The foamed thermoplastic resin structural article is allowed to cool and congeal in the cavity. After a suitable time, the foamed thermoplastic structural article characterized by a surface which has a swirl pattern is removed from the cavity.

A typical apparatus which can be used to practice the process of this invention is shown in the drawing. The apparatus includes an extruder 10 having a generally cylindrical housing 11 having a rear portion 11a and a forward portion 11b, a cavity 12 and a multi-zone screw 13 enclosed in the cavity 12. A solids feed hopper 14 communicating with the cavity 12 by means of an inlet 10a is provided at the rear portion 11a. A discharge nozzle 15 is positioned in the forward portion 11b. An orifice 16 in the housing 11 provides means for introducing water into the cavity 12 through injecting means 16a which includes suitable piping 16b and metering pump 16c connected thereto. The shaft 17 of the multi-zone screw 13 extends rearwardly through an opening 11c and is coupled to a motor 18 by coupling means 19. The motor 18, only a portion of which is shown, may include a suitable gear reduction means. A thermoplastic resin 20, usually in the form of resin pellets or other small particles, is charged into the extruder 10 through solids feed hopper 14 and inlet 10a. The multi-zone screw 13 has a varied-sized minor diameter $d$, as shown, and a constant size major diameter D. The varied-sized minor diameter $d$ divides the extruder cavity 12 into several zones, namely, a first feeding zone 13a, a first compression zone 13b, a first metering zone 13c, a second metering zone 13d, a second compression zone 13e, and a second metering zone 13f. An accumulator 21 is positioned at the forward portion 11b of the housing 11. The accumulator 21 comprises a generally cylindrical housing 22 having an upper end 22a and a lower end 22b. The upper end 22a of the accumulator is closed by a plate 23 having a centrally located opening 24. A nozzle 25 is attached to the lower end 22b. The nozzle 25 extends downward from the lower end 22b to nozzle 15 in the extruder 10 as shown and forms a continuous path with the nozzle 15 and cavity 12. A movable piston 26 and a piston rod 27 connected to and extending rearwardly from piston 26 outwardly through the opening 24 are provided interiorly of the housing 22 of the accumulator 21. The rear portion (not shown) of the rod 27 is connected to a suitable pressure storage means (not shown). A rotatably movable valve 28 is inserted in an opening 11d in the forward portion 11b and extends into nozzle 15 so that passage 28a in the valve 28 can be aligned with the nozzle 15. A mold M having a cavity C is clamped to the forward portion 11b of the extruder housing 11.

In the process of the invention and referring to the drawing of the apparatus suitable for practice of the invention, a thermoplastic resin 20 is charged into the feeding zone 13a of the multi-zoned screw 13 in the cavity 12 through the feed hopper 14 and inlet 10a. The screw 13 is rotated by the motor 18. The rotation of the screw advances the thermoplastic resin 20 through the cavity 12. The thermoplastic resin 20 is heated in the extruder by a suitable heating means (not shown) and is melted by the externally applied heat and shear forces as it advances through the first compression zone 13b. The melted pliable and mobile thermoplastic resin 20 then advances through the first metering zone 13c. At the end of the first metering zone the melted thermoplastic resin 20 enters the second feed zone 13d. The foaming agent 20a, water, is introduced under pressure into the cavity 12 of the extruder 10 through injecting means 16a and orifice 16. The quantity of water introduced into the extruder is controlled by adjusting the stroke length in metering pump 16c. The stroke of the metering pump 16c may be set or read on the pump setting dial 16d. the quantity of water added is between about 0.1 to about 0.5 weight percent of the charge weight of the melted thermoplastic resin 20 in zone 13d to produce a swirl-free, indent-free foamed thermoplastic structural article. The melted thermoplastic resin 20 and water are then advanced through the second compression zone 13e. The melted thermoplastic resin 20 and water are mixed to form a substantially uniform foamable mixture in the second compression zone 13e and metering zone 13f of the extruder 10 by the mechanical mixing and shearing action of the screw 13 as it rotates and advances the melted thermoplastic resin within the extruder 10. As shown, the valve 28 is initially closed. The foamable mixture is, therefore, forced by pressure exerted on the foamable mixture in the extruder 10, through nozzle 15 and nozzle 25 into the accumulator 21. Back pressure applied to the foamable mixture by pressure applied to piston 26 through the rod 27 extending to the pressure storage means (not shown) prevents foaming of the foamable mixture but does not inhibit the flow of the foamable mixture into the accumulator 21. When the accumulator 21 is sufficiently filled, the passage 28a in the valve 28 is aligned with nozzle 15 to connect the accumulator 21 to the cavity C formed in the closed mold M. The pressure applied to the foamable mixture through piston 26 and rod 27 forces the foamable mixture from the accumulator 21 into the cavity C in the mold M. Since the pressure in the cavity C in the mold M is less than the pressure applied to the foamable mixture in the accumulator 21 or in extruder 10, a quantity of the foamable mixture enters the cavity C and the water, now in the form of steam mixed throughout the plastic, expands, frothing the thermoplastic resin which as a consequence expands to completely fill the cavity C. A foamed thermoplastic structural article which is swirl-free and indent-free results after the resin has cooled and solidified.

While I have shown the accumulator 21 in a vertical position with respect to the extruder 10, the accumulator 21 can be mounted in any position, for example horizontal, at a 45° angle, etc., to the extruder 10 and achieve the results of the invention.

It is also possible to add suitable known equipment to the accumulator whereby auxiliary pressure can be applied through rod 27 and piston 26 to the foamable mixture stored therein to actively force the foamable mixture into the cavity C in the mold M.

While I have shown the use of 0.1 to 0.5 weight percent water, it must be understood that water in an amount of 0.1 to 2.0 weight percent can be used to produce a swirl-free article which may, however, contain undesirable, but often acceptable, indent portions if about 0.5 weight percent water content is exceeded in the plastic.

In determining the quantity of water required to produce a swirl-free, indent-free foamed thermoplastic structural article, a series of articles, a square picture frame which had a border which was 2 inches wide, three-eighth of an inch thick and an outside length of 19 inches, were produced using high impact polystyrene. One article made from a foamable mixture containing 0.15 weight percent water was swirl-free and indent-free. The article had a density of 0.99 grams per cubic centimeter as compared to a substantially identical solid article which had a density of 1.04 grams per cubic centimeter. No cellular structure was physically visible to the unaided eye. An article made from a foamable mixture containing 2.5 weight percent water had a relatively smooth surface but swirl was visible to the unaided eye. A minor indent in one corner and a severe indent in a second corner were present in the article. A third article made from a foamable mixture containing 0.53 weight percent water had a smooth surface with no swirl visible to the unaided eye but slight indent was visible in one corner of the article.

Other thermoplastics such as ABS resins, polyethylene, polypropylene or acrylics may also be foam molded by my method.

Thermoplastic resins foamed by the method of this invention may incorporate additives such as stabilizers, pigments, and fillers. Surfactants can be incorporated to assist in stabilizing the cell structure.

The equipment utilized in this foam molding method may vary, and the type of equipment described in the preferred embodiment is meant to be illustrative only.

By utilizing the discovery I have made in the particular ranges of water which are useful to achieve a swirl-free and indent-free article, it is now possible to manufacture a foamed thermoplastic structural article which is more pleasing in appearance and more desirable in properties than was possible before my discovery.

A preferred method by which this invention may be practiced is given in the following examples.

EXAMPLE I

High impact polystyrene pellets (Union Carbide Corp. TMDA 6862) are fed to a 2½ inches diameter extruder, with an L/D (length diameter ratio) of 24/1. The extruder is a single screw-type as shown in the drawing. The thermoplastic resin is melted in the first compression zone by a combination of external heat and shear energy. The extruder pressure is maintained at between about 1700 and 2000 pounds per square inch (psi.) and a temperature of about 475° F., which conditions are sufficient to convert the resin pellets to a molten state. The melted thermoplastic resin is introduced into a second feed zone. Water of about 2.0 weight percent of the melted thermoplastic resin charge is introduced into the extruder through an orifice in the extruder. The mixture of water and melted thermoplastic resin is advanced in the extruder through a second compression zone whereby the water and thermoplastic resin are mixed and an adequate degree of homogenization is attained. The foamable mixture is passed into an accumulator. The foamable mixture is subsequently delivered from the accumulator into a cavity in a mold. A completed foamed polystyrene structural article made by Example I method had no visible swirl and barely perceptible indent in one corner of the foamed thermoplastic article.

EXAMPLE II

Similarly, a second experiment was conducted in which the foaming agent and thermoplastic resin and conditions were the same as Example I. In the second example, however, the quantity of water introduced into the extruder was 0.5 weight percent of the charge. The finished article was both swirl-free and indent-free.

The cooling of the mold in Example I is controlled by a water jacket maintained between 50° and 80° F. at which temperature the polystyrene quickly solidifies. The cooling rate is not critical except that it should be rapid enough so that the surface of the molded article solidifies while the interior remains sufficiently hot to maintain water in the gaseous state.

I claim:

1. In a method for producing a foamed thermoplastic structural article characterized by a smooth, uniform swirl-free surface, wherein a substantially uniform foamable mixture of water and a melted thermoplastic resin is formed in an extruder and said mixture is advanced under a predetermined pressure from the extruder to an accumulator and subsequently to a cavity in a mold, which cavity is at a lower pressure than the pressure applied to the foamable mixture in the extruder and in the accumulator, whereby the water in the form of steam causes the melted thermoplastic resin to foam and expand to completely fill the cavity in the mold, the method comprising restricting the quantity of said water introduced into said melted thermoplastic resin in said extruder within a range of between about 0.1 to about 2.0 weight percent of the charge weight of the thermoplastic resin in the extruder.

2. The method according to claim 1 in which the thermoplastic is polystyrene.

3. The method according to claim 1 in which the accumulation zone melt temperature is from about 250° to about 600° F. and the accumulation zone pressure is from about 1200 to about 5000 psi.

4. The method according to claim 3 in which the mold temperature is not more than about 120° F.

5. In a method for producing a foamed thermoplastic structural article characterized by a smooth, uniform swirl-free and indent-free surface, wherein a substantially uniform foamable mixture of water and a melted thermoplastic resin is formed in an extruder and said mixture is advanced under a predetermined pressure from the extruder to an accumulator and subsequently to a cavity in a mold, which cavity is at a lower pressure than the pressure applied to the foamable mixture in the extruder and in the accumulator, whereby the water in the form of steam causes the melted thermoplastic resin to foam and expand to completely fill the cavity in the mold, the method comprising controlling the quantity of said water present in said melted thermoplastic resin in said extruder within a range of about 0.1 to about 0.5 weight percent of the charge weight in the extruder.

6. The method according to claim 5 in which the thermoplastic is polystyrene.

7. The method according to claim 5 in which the accumulation zone melt temperature is from about 250° to about 600° F. and the accumulation zone pressure is from about 1200 to about 5000 psi.

8. The method according to claim 7 in which the mold temperature is no more than about 120° F.

* * * * *